United States Patent
Loeschinger et al.

(10) Patent No.: US 10,365,729 B2
(45) Date of Patent: Jul. 30, 2019

(54) VIBRATION-BASED TRAJECTORY CALCULATION OF A FREELY-GUIDED DEVICE

(71) Applicant: FRAUNHOFER GESELLSCHAFT ZUR FOERDERUNG DER ANGEWANDTEN FORSCHUNG E.V., Munich (DE)

(72) Inventors: Juergen Loeschinger, Tuebingen (DE); Bernhard Kleiner, Ostfildern (DE)

(73) Assignee: FRAUNHOFER GESELLSCHAFT ZUR FÖRDERUNG DER ANGEWANDTEN FORSCHUNG E.V., Gyeonggi-do (KR)

(*) Notice: Subject to any disclaimer, the term of this patent is extended or adjusted under 35 U.S.C. 154(b) by 0 days.

(21) Appl. No.: 15/513,541

(22) PCT Filed: Sep. 23, 2015

(86) PCT No.: PCT/EP2015/071895
§ 371 (c)(1),
(2) Date: Mar. 22, 2017

(87) PCT Pub. No.: WO2016/046276
PCT Pub. Date: Mar. 31, 2016

(65) Prior Publication Data
US 2017/0308183 A1 Oct. 26, 2017

(30) Foreign Application Priority Data
Sep. 23, 2014 (DE) .................. 10 2014 219 169

(51) Int. Cl.
*G06F 3/0346* (2013.01)
*G06F 3/038* (2013.01)
*G06F 3/0354* (2013.01)

(52) U.S. Cl.
CPC ............ *G06F 3/0346* (2013.01); *G06F 3/038* (2013.01); *G06F 3/03543* (2013.01); *G06F 3/03545* (2013.01)

(58) Field of Classification Search
CPC .... G06F 3/0346; G06F 3/03545; G06F 3/038; G06F 3/043; G06F 3/0433; G06F 3/0436
See application file for complete search history.

(56) References Cited

U.S. PATENT DOCUMENTS

| 4,931,965 A * | 6/1990 | Kaneko | G06F 3/0433 178/18.04 |
| 7,493,220 B2 | 2/2009 | Leigh et al. | |

(Continued)

FOREIGN PATENT DOCUMENTS

| EP | 2264580 A2 | 12/2010 |
| JP | H07110736 A | 4/1995 |

(Continued)

OTHER PUBLICATIONS

ISA European Patent Office, International Search Report Issued in Application No. PCT/EP2015/071895, dated Nov. 5, 2015, WIPO, 2 pages.

(Continued)

*Primary Examiner* — Kenneth Bukowski
(74) *Attorney, Agent, or Firm* — McCoy Russell LLP

(57) ABSTRACT

The present invention relates to a method for determining at least one motion parameter of a freely-guided electronic device on a substrate, such as the velocity of the movement of the freely-guided electronic device, comprising: determining a measurement of a vibration signal, which is generated by the interaction between the freely-guided electronic device and the substrate, and a determination of the (Continued)

motion parameter of the freely-guided electronic device from the measured vibration signal of the freely-guided electronic device.

18 Claims, 7 Drawing Sheets

(56) References Cited

U.S. PATENT DOCUMENTS

| | | | | |
|---|---|---|---|---|
| 2002/0190963 | A1* | 12/2002 | Van Dam | G06F 3/043 345/173 |
| 2008/0152202 | A1* | 6/2008 | Moise | G06K 9/00154 382/120 |
| 2008/0234983 | A1* | 9/2008 | Leigh | G01H 1/003 702/190 |
| 2010/0073292 | A1* | 3/2010 | Amm | G06F 3/03543 345/163 |
| 2010/0315334 | A1* | 12/2010 | Choi | G06F 3/038 345/157 |
| 2011/0261655 | A1* | 10/2011 | Aklil | G01N 29/50 367/125 |
| 2011/0288805 | A1* | 11/2011 | Dejnabadi | G01P 7/00 702/96 |
| 2014/0267175 | A1* | 9/2014 | Hecht | G06F 3/0436 345/177 |

FOREIGN PATENT DOCUMENTS

| | | |
|---|---|---|
| JP | H07110737 A | 4/1995 |
| JP | H09305290 A | 11/1997 |
| JP | 2001125727 A | 5/2001 |
| JP | 2001264151 A | 9/2001 |
| JP | 2008188092 A | 8/2008 |
| JP | 2012221435 A | 11/2012 |
| JP | 2012232617 A | 11/2012 |
| WO | 0207424 A2 | 1/2002 |

OTHER PUBLICATIONS

Japan Patent Office, Office Action Issued in Application No. 2017-514292, dated Mar. 13, 2018, 9 pages.
Korean Intellectual Property Office, Office Action Issued in Application No. 10-2017-7010650, dated Mar. 30, 2018, 13 pages.

* cited by examiner

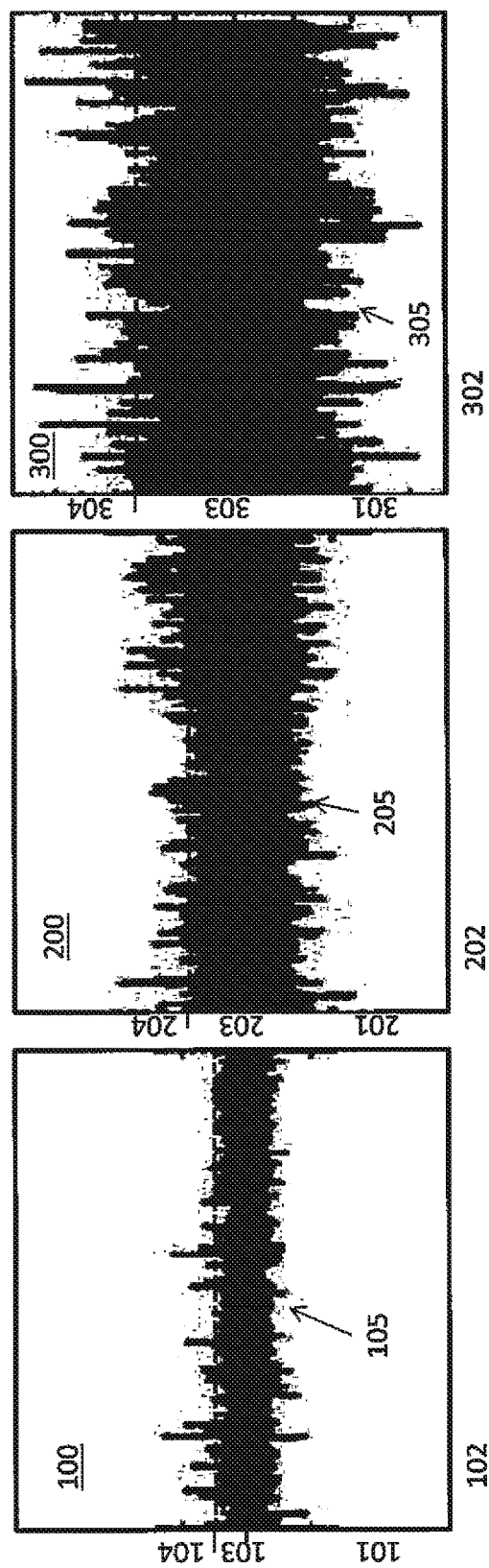

VIBRATION-BASED TRAJECTORY CALCULATION OF A FREELY-GUIDED DEVICE

CROSS-REFERENCE TO RELATED APPLICATIONS

The present application is a U.S. National Phase of International Patent Application Serial No. PCT/EP2015/071895 entitled "VIBRATION-BASED TRAJECTORY CALCULATION OF A FREELY-GUIDED DEVICE," filed on Sep. 23, 2015. International Patent Application Serial No. PCT/EP2015/071895 claims priority to German Patent Application No. 102014219169.6, filed on Sep. 23, 2014. The entire contents of each of the above-referenced applications are hereby incorporated by reference for all purposes.

STATE OF THE ART

The invention relates to a method for determining at least one motion parameter of a freely-guided electronic device as well as a freely-guided electronic device.

The ever increasing use of electronic information and communication systems, especially of personal computers (PCs), laptops, tablets and smart phones in everyday life, leisure and work, makes it worthwhile to develop improvements of human-machine interfaces.

As human-machine interfaces, besides input devices such as keyboard, mouse or touch-sensitive surfaces, freely-guided and electronic-based devices, such as electronic scalpels or other electronic tools, such as in particular electronic pens, are especially of interest.

Electronic pens have inter alia the advantage that they can combine the functionality and simplicity of writing with a pen on a surface with the much more numerous possibilities of electronic data processing. Thereby it is desirable that the electronic pen is similar to a conventional pen as far as possible in appearance and handling.

In WO02/07424A2 for example, an electronic information system for handwriting recognition is described, which has a pen and a tablet with pressure- or induction-sensitive surface and in which the movements of the pen or the pen tip are captured either from the pressure or induction-sensitive surface of the tablet or by acceleration sensors or optical sensors.

The sensor data can then be transmitted wirelessly to a PC, which can, based on the received pen motion data, perform handwriting recognition.

In general for the capture of movements of a freely-guided device, for example an electronic pen, by measurement sensors, such as for example acceleration sensors or rotation rate sensors, the data of said sensors have to be integrated once or twice so as to obtain a velocity signal (first integration) or a trajectory or location signal (second integration) of the freely-guided device, e.g. of an electronic pen.

A disadvantage of this double integration is mainly that even small errors in the measurements of acceleration and/or angular velocities by the measuring sensors of the freely-guided electronic device, e.g. an electronic stylus, may result in the first integration to larger errors in the determination of the velocity/the velocity signal, which in turn can lead after integration of the velocity signal to even larger errors in the determined trajectory or in the determined location signal.

Task

It is therefore the object of the present invention to improve a freely-guided electronic device, especially with respect to the accuracy with which movements or trajectories of the freely-guided device can be captured and determined.

Solution

According to the present invention, this object is achieved by a method for determining at least one motion parameter of a freely-guided electronic device on a substrate, comprising determining a measurement of a vibration signal, which is generated by an interaction between the freely-guided electronic device and the substrate, and determining the at least one motion parameter of the freely-guided electronic device from the measured vibration signal of the freely-guided electronic device; as well as by a freely-guided electronic device.

Advantageous embodiments and further developments are the subject matter of the dependent claims.

A freely-guided electronic device can herein be understood as a device, which can be moved freely by a user, for example by hand or by foot, and which may be provided with electronic components, such as, for example, measurement sensors.

For example, said freely-guided electronic device can be an electronic pen, an electronic glove, for example, for applications with a massage or for orthopedic applications, a prosthesis, an electronic tool, e.g. a machining tool, a brush, or the like.

A method according to the present invention for determining at least one motion parameter of a freely-guided electronic device on a substrate, such as the velocity of movement of the electronic device, may comprise a measurement of a vibration signal, which is generated by the interaction of the electronic device and the substrate, and a determination of the motion parameter of the electric device, for example said velocity of movement of the electronic device, from said measured vibration signal of the electronic device.

For example the to be determined at least one motion parameter can be the velocity of a pen movement of an electronic pen, and the vibration signal can, for example, be generated by the interaction of the electronic pen with the substrate, for example a substrate such as paper. The determination of the velocity of the pen movement of the electronic pen, for example, can then be determined according to the invention from said measured vibration signal.

The vibration signal can thereby be generated by the contact of the freely-guided electronic device with a substrate, and can inter alia for example be measured with vibration sensors or acoustic sensors, such as for example microphones.

When for example the tip of an electronic pen, for example the writing rod tip, is moving with a specific contact pressure on a writing substrate vibrations can occur. During handwriting these vibrations can be both felt and heard and can be measured, inter alia, via vibration sensors or acoustic microphones.

Likewise, however, the vibrations or a vibration signal can be measured or determined by the measurement sensors of the freely-guided electronic device, for example an electronic pen, from the acceleration sensors data, and may serve to determine the motion, orientation and position of the freely-guided electronic device.

The vibration signal can thereby be measured along one axis or for one dimension, or also along two or three axes or for two or three dimensions. For example, the vibration signal can be measured with respect to a two- or threedimensional reference system for the determination of motion, orientation and position of the freely-guided electronic device.

The determination according to the invention of the motion parameter of the freely-guided electronic device, for example an electronic pen, from the measured vibration signal of the freely-guided electronic device, for example an electronic pen, advantageously allows to improve the calculation of a trajectory/of trajectories of the freely-guided electronic device, for example an electronic pen, i.e. allows to improve the accuracy of the calculation of the traversed distance(s) covered by the freely-guided electronic device, for example an electronic pen, or the accuracy with which the position/the location signal of the freely-guided device, for example an electronic pen, can be determined.

The determination of the motion parameter of the freely-guided electronic device, for example an electronic pen, from the measured vibration signal of the freely-guided electronic device, can for example comprise the determination of the velocity of movement of the freely-guided electronic device, for example the velocity of a pen movement or pen velocity, wherein the term velocity may also comprise angular velocities.

Advantageously, the determination of the motion parameter, in particular the determination of the velocity of movement of the freely-guided electronic device, i.e. for example the determination of the velocity of pen movements, can thereby be carried out without the integration of acceleration data, in particular without the integration of translational acceleration data.

The thus determined velocity/determined velocity data of the device movement, for example a pen movement, or the device movement velocity, for example a writing velocity, can serve as a basis for the calculation of the trajectory/trajectories of the freely-guided electronic device, for example an electronic pen, wherein the trajectory/trajectories of the freely-guided electronic device, for example an electronic pen, may for example be determined from a single integration of velocity data derived from said measured vibration signal of the freely-guided electronic device, for example an electronic pen.

In other words, for example, the calculation of the trajectory/trajectories of the freely-guided electronic device, for example an electronic pen, can already be achieved with a single integration, namely with the single integration based on velocity data determined from the vibration signal of the freely-guided electronic device, for example an electronic pen, rather than with a conventional double integration of acceleration data.

Besides the reduction of the number of necessary integration steps, the shortened integration time of a single integration of velocity data can, in comparison with conventional methods for the calculation of the trajectory of a freely-guided electronic device, for example an electronic pen, can lead to an improved accuracy of the trajectory calculation, since a typical movement of the freely-guided electric device, for example a writing movement, may usually only last a few seconds.

Moreover, the vibration signal, which serves to determine the motion parameter of the freely-guided electronic device, for example an electronic pen, can be determined from an acceleration signal and/or from an acoustic signal.

This can, for example, be achieved via the data from the measurement sensors of the freely-guided electronic device, for example the measurement sensors of an electronic pen, as well as for example via data from already existing acceleration sensors, and/or via data from a vibration sensor specifically designed for the measurement of said vibration signal, and/or from data of an acoustic sensor, for example microphone.

Since usually a freely-guided electronic device, for example an electronic pen, is already equipped with acceleration sensors for the determination of position and motion, it can be advantageous to use the acceleration data of these already present acceleration sensors for the determination of the vibration signal. The vibration signal can therefore be filtered out from already present acceleration data as additional information.

While in conventional methods for the determination of the trajectory of a freely-guided electronic device, for example an electronic pen on a writing substrate, this additional information is not taken into account or is even seen as a source of interference, the present invention allows to extract a vibration signal from the acceleration data, which can significantly improve the accuracy of the trajectory calculation of the freely-guided electronic device, for example an electronic pen.

In addition, an unnecessary increase in the complexity of the construction of the freely-guided electronic device, for example an electronic pen, can be avoided, since there is no need for additional internal and/or external sensors.

Within the framework of the determination according to the invention of a motion parameter of a freely-guided electronic device, for example an electronic pen, an/the amplitude of the vibration signal and/or the frequency spectrum of the vibration signal can be determined.

The vibration signal can be characterized by its/an amplitude, as well as by its frequency spectrum. Thereby, the amplitude and the frequency spectrum can be dependent on the motion parameter to be determined, and for example can be dependent on the velocity of the device movement, for example the velocity of a pen movement.

The/an amplitude of a vibration signal may herein inter alia also be understood as an amplitude of a processed vibration signal, which has been processed by one or more method steps, such as for example filtering and multiplication.

The correlation of the to be determined motion parameter, such as for example the velocity of the device movement, with an/the amplitude or frequency spectrum of the vibration signal, can be nearly independent from the influence of the substrate within a class of similar substrate materials.

For example the correlation of the to be determined motion parameter, for example the velocity of a pen movement, with a/the amplitude or frequency spectrum of the vibration signal, can be nearly independent from the influence of the writing substrate within a class of similar writing substrate materials, such as for example paper, cardboard, foil etc.

However it is also conceivable, that for a known motion parameter, such as for example the velocity of the device movement, for example the velocity of a writing movement, derived from the measured vibration signal or derived from an amplitude and/or the frequency spectrum of the vibration signal, different classes of substrates can be recognized or distinguished, and so, for example, different writing substrate material, such as for example blackboard a whiteboard, textiles or stone can be distinguished.

An advantageous linear correlation between the measured vibration signal and the motion parameters to be determined is produced for example from an envelope curve calculation of the vibration signal.

Said envelope curve calculation or envelope curve determination may comprise at least a portion of the following steps.

First an optional high-pass filtering of the vibration signal can be carried out.

Then a calculation of the average power of the vibration signal over a predetermined time window range around a current measurement time point can be carried out.

Here, an exemplary time window range can lie for example at 12 to 60 samples.

For exemplary sampling frequencies of the vibration signal of more than 50 Hz, 100 Hz or more than 200 Hz, time window ranges around a current measurement time point can for example be derived by the quotient of samples/sampling frequencies, i.e., for example, at a sampling frequency of 200 Hz, 50 samples correspond to 0.25 s.

Then, optionally, a low-pass filtering of the vibration signal can be carried out.

Finally, a calculation of the amplitude of the vibration signal from the average power of the vibration signal can be performed, i.e. in other words, a back-transformation of the average power of the vibration signal to the amplitude of the vibration signal can be carried out, so that an envelope curve of the vibration signal can be obtained.

An envelope curve can herein be understood as the course or behaviour of the amplitude of the vibration signal, in particular, for example, as the course of the maxima of the squared and square rooted amplitude of the vibration signal.

The amplitude course of the obtained envelope curve of the vibration signal can thereby at least partially be in a linear relation with the to be determined motion parameter of the freely-guided electronic device, such as for example the velocity of a pen movement of an electronic pen.

In addition, for example, a final calculation of the average amplitude of said obtained envelope curve of the vibration signal can be carried out, for example, over a predetermined time window range around a current measurement time point, for example, over a predetermined time window range of 12 to 60 samples, preferably 15 to 25 samples.

Through said exemplary high-pass filtering the direct component in the vibration signal can be suppressed, so that the vibration signal can advantageously lie around a reference point or reference value, for example, around a zero point.

Said exemplary calculation of the average power of the vibration signal may include a squaring of the vibration signal.

Alternatively, a rectification of the vibration signal in the calculation of the average power of the vibration signal is also conceivable.

Regarding for example said calculation of the average power of the vibration signal as a forward transformation, the said back-transformation of the average power of the vibration signal to the amplitude of the vibration signal can for example be carried out by an inverse operation with respect to said squaring, i.e. by a rooting operation, i.e. by a square rooting operation.

Said exemplary low-pass filtering may advantageously serve to suppress undesirable higher-frequency vibrations, so that an envelope curve with a noise as low as possible can be obtained.

The high-pass filtering can thereby be performed with a cutoff frequency, which, for example can be more than 20, 30, or 40 Hz.

The low-pass filtering can be performed with a cutoff frequency, which, for example may be below 10 or 5 Hz.

For a/the high-pass filtering and/or a/the low-pass filtering inter alia multiple filters, for example 5-pole filters, with finite impulse response ("finite impulse response filter", FIR-filter, sometimes also called transversal filter) can be used.

In other words, the vibration signal can be smoothed by means of sliding averaging (moving average filter).

Any further quantification of the vibration signal can also be done through the use of variables such as spectral energy and/or spectral entropy.

Additionally or alternatively to the envelope curve determination the power frequency spectrum of the vibration signal can be determined.

In this case, the median power frequency for various motion parameter values, also called Median Power Frequency (MPF) factor, e.g. for different velocity values of the velocity of the device movement, for example, a pen movement, is determined. This MPF factor can advantageously characterize the power frequency spectrum of the vibration signal with one value.

The at least partially approximately linearly extending correlation between the median power frequency and the motion parameter, e.g. the velocity of movement of the freely-guided electronic device, for example a pen movement, can thereby serve to determine said motion parameter of the freely-guided electronic device, e.g. an electronic pen, from the measured vibration signal.

By the exemplary derivation according to the invention of an at least partially linear correlation between the vibration signal, more specifically the amplitude of the envelope curve of the vibration signal and/or the median of the power frequency of the vibration signal, and the to be determined motion parameter of the freely-guided device, for example the velocity of the movement of an electronic pen, in particular those motion parameter values, for example velocity values is less than 10 mm/s, can advantageously be determined, which in conventional methods can often be lost in noise, such as in the noise of the acceleration signals, and which may cause undesirable problems in a conventional double integration for a trajectory determination.

In other words a method for determining the trajectory of a freely-guided electronic device on a substrate, for example an electronic pen on a writing substrate, may comprise the determination of the motion parameter of the freely-guided electronic device, for example an electronic pen, and for example may comprise a determination of the velocity signal of the movement of the freely-guided electronic device, for example the determination of a velocity signal of a pen movement of an electronic pen.

Thereby the determination of the motion parameter, i.e. for example the determination of the velocity signal of the movement of the freely-guided electronic device, for example a pen movement, can be based upon a measurement of a vibration signal, wherein the measured vibration signal can be generated by the interaction between the freely-guided electronic device and the substrate, for example by the interaction between an electronic pen and a writing substrate.

Finally, for example, an integration of the motion parameter determined from the vibration signal, for example an integration of the velocity signal of the movement of the freely-guided electronic device, for example the pen movement of an electronic pen, can lead to the determination of the trajectory of a freely-guided electronic device, for example of an electronic pen.

Besides a first velocity signal, for example the velocity of the movement of the freely-guided electronic device, for example a pen movement, derived according to the invention from a vibration signal, in addition also a second velocity signal, for example derived from the integration of acceleration data, may be used for the trajectory calculation.

The use of two independently determined velocity signals can further increase the accuracy of the trajectory calculation.

Moreover, it is conceivable, that also the information about the absence of a vibration signal, or about the falling below a minimum vibration signal threshold may be utilized, for example to be able to terminate an integration or a double integration for the trajectory determination of the freely-guided device, or to be able to distinguish between movement of the freely-guided device and no movement of the freely-guided device.

Thereby, a standstill of the freely-guided device on a substrate can advantageously be recognized even if the freely-guided device itself is not at rest.

For example a standstill of the pen tip of an electronic pen on a writing substrate may be recognized even if the pen itself is not at rest, for example when it is moved by hand movements with the tip being a pivot point.

Commonly used methods for standstill detection, such as the evaluation of the standard deviation of acceleration sensors signals, however, would fail in such cases.

A freely-guided electronic device with position detection according to the invention can comprise at least an electric voltage source, at least a digital control unit, at least one data transmission module, as well as measurement sensors.

Illustratively, an electronic pen according to the invention with pen position detection may comprise a writing rod, at least one electric voltage source, at least one digital control unit, at least one data transmission module, as well as measurement sensors.

The measurement sensors can thereby be configured such that they can capture a vibration signal, which is generated by the interaction between the freely-guided electronic device and a substrate, for example by the interaction between an electronic pen and a writing substrate.

Furthermore the measurement sensors and/or the digital control unit can be arranged such that from the measured vibration signal a motion parameter of the freely-guided electronic device, for example an electronic pen, can be determined, for example a velocity signal of the movement of the freely-guided electronic device, for example a velocity signal of a pen movement of an electronic pen, so that a determination of the trajectory and position of the freely-guided electronic device, for example a determination of the trajectory and position of an electronic pen, can be made possible.

Sensors of the measurement sensor system may inter alia be realized as inertial sensors whose measuring principle is based on the inertia and the mechanical deflection of spring loaded test masses. Preferably, such inertial sensors can be embodied by micro-electro-mechanical system (MEMS), wherein for example mechanical structures can be realized in a layer of polysilicon.

However, also sensors are conceivable, which are not inertial sensors and which are based on other measuring principles, such as magnetic field sensors that operate based on the Hall effect or the giant magnetoresistance effect and that can be realized without any moving mechanical parts. A preferred embodiment may comprise, for example, sensors of the type Förster probe, also known as flux gate sensors.

Said measurement sensor system of the freely-guided electronic device, for example of an electronic pen, in particular may comprise one or more sensors of at least one of the following types: acceleration sensor and/or rotation rate sensor and/or magnetic field sensor and/or acoustic sensor.

BRIEF DESCRIPTION OF THE FIGURES

The following figures show exemplary:

FIG. 1A shows an exemplary vibration signal of freely-guided electronic device for a first velocity of a device movement / exemplary vibration signal of an electronic pen for a first velocity of a pen movement.

FIG. 1B shows an exemplary vibration signal of freely-guided electronic device for a second velocity of a device movement / exemplary vibration signal of an electronic pen for a second velocity of a pen movement.

FIG. 1C shows an exemplary vibration signal of freely-guided electronic device for a third velocity of a device movement / exemplary vibration signal of an electronic pen for a third velocity of a pen movement.

DETAILED DESCRIPTION

Figure 2A:
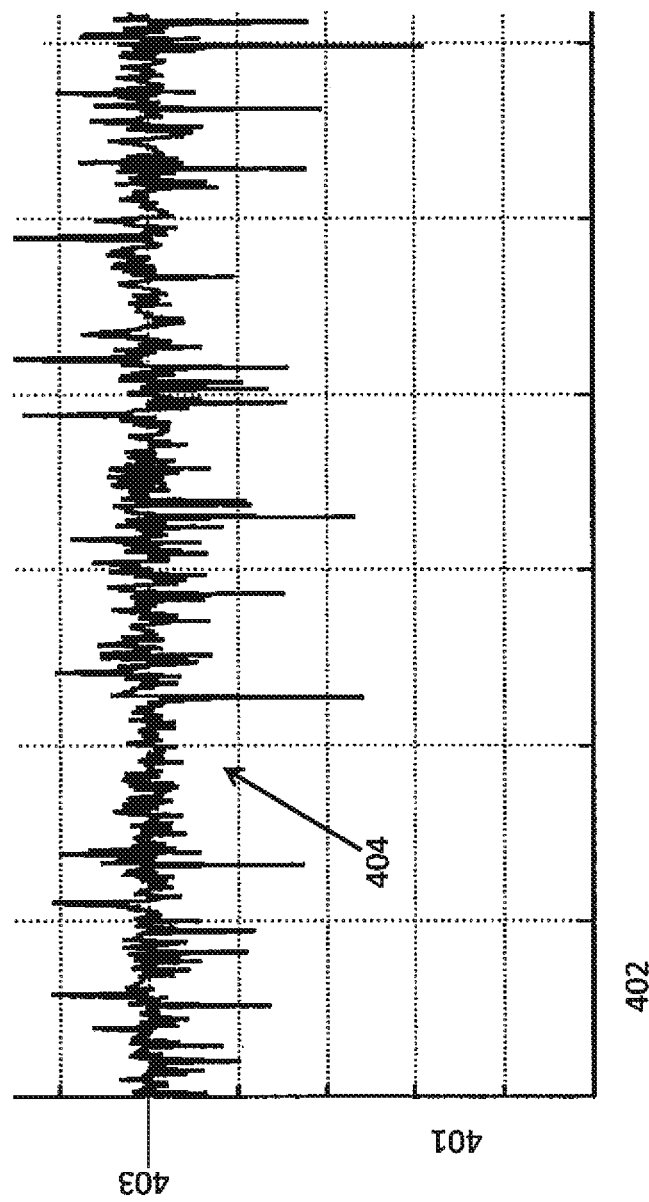
FIG. 2A shows an exemplary raw or unfiltered vibration signal.

The FIGS. 1A, 1B and 1C illustrate exemplary time series diagrams of exemplary, for example unfiltered, vibration signals 105, 205, 305 of a freely-guided electronic device, e.g. an electronic pen, for three different, in sequence, increasing velocities 100, 200, 300 of the device movement, e.g. of a pen movement.

The ordinate axes 101, 201 and 301, for example, may represent axes of acceleration, e.g. the vector sum of an acceleration signal, wherein the ordinate values 103, 203 and 303, for example, may represent reference values for the vibration signals 105, 205, 305, such as for example a zero value or the value of the earth acceleration. In the exemplary time series diagrams 1a, 1b and 1c, for example, the vibration signal 105, 205, 305 fluctuates on average symmetrical about the ordinate values 103, 203 and 303.

The abscissa axes 102, 202 and 302 may be, for example, time axes.

The scales of the exemplary time series diagrams 1a, 1b and 1c are equal, for better comparison of the vibration signals 105, 205, 305.

In other words the amplitude, or average amplitude, of the vibration signals 105, 205, 305 correlates linearly with the velocity 100, 200, 300 of the device movement, for example a pen movement, such that the amplitude, or average amplitude, 104, 204, 304 of the vibration signal 105, 205, 305, increases with increasing velocity 100, 200, 300 of the device movement, e.g. a pen movement.

The value of the average amplitude 104, 204, 304 (marked as a dotted line) of the vibration signal 105, 205, 305 may, for example, in this case also, inter alia, define an envelope curve of the vibration signal 105, 205, 305.

The correlation of measurement parameters for the vibration signal 105, 205, 305, such as the average amplitude 104, 204, 304 and/or the average power of the vibration signal 105, 205, 305, with a motion parameter of the freely-guided electronic device on a substrate, for example, an electronic pen on a writing substrate, such as the velocity of 100, 200, 300 of the device movement, e.g. a movement of an electronic pen, therefore allows to determine said motion parameters of the freely-guided electronic device, e.g. an electronic pen, such as e.g. the velocity 100, 200, 300 of the device movement, e.g. the velocity of a pen movement, from the vibration signal 105, 205, 305.

FIG. 2A exemplary shows a time series diagram of an unfiltered or unprocessed vibration signal 404 of a freely-guided electronic device, e.g. an electronic pen, wherein the freely-guided electronic device, for example, moves with a variable time-dependent velocity.

Said vibration signal 404 may be, for example, representative of one of a plurality of vibration signal channels, wherein, for example, a vibration signal channel may represent a vibration signal along an axis or for a dimension.

The ordinate axis 401, for example, may represent an acceleration axis, e.g. the vector sum of an acceleration signal, wherein the ordinate value 403, for example, may represent a reference value for the vibration signal 404, such as a zero value or the value of the earth acceleration, and wherein, for example, the vibration signal 404 may fluctuate around the ordinate value 403.

The abscissa axes 402 may be for example a time axis.

Vibration signal 404 can be regarded as exemplary initial vibration signal and the subsequent FIGS. 2B, 2C, 2D and 2E may be construed as exemplary processing steps or method steps in relation to this initial vibration signal or vibration signal 404.

Figure 2B:
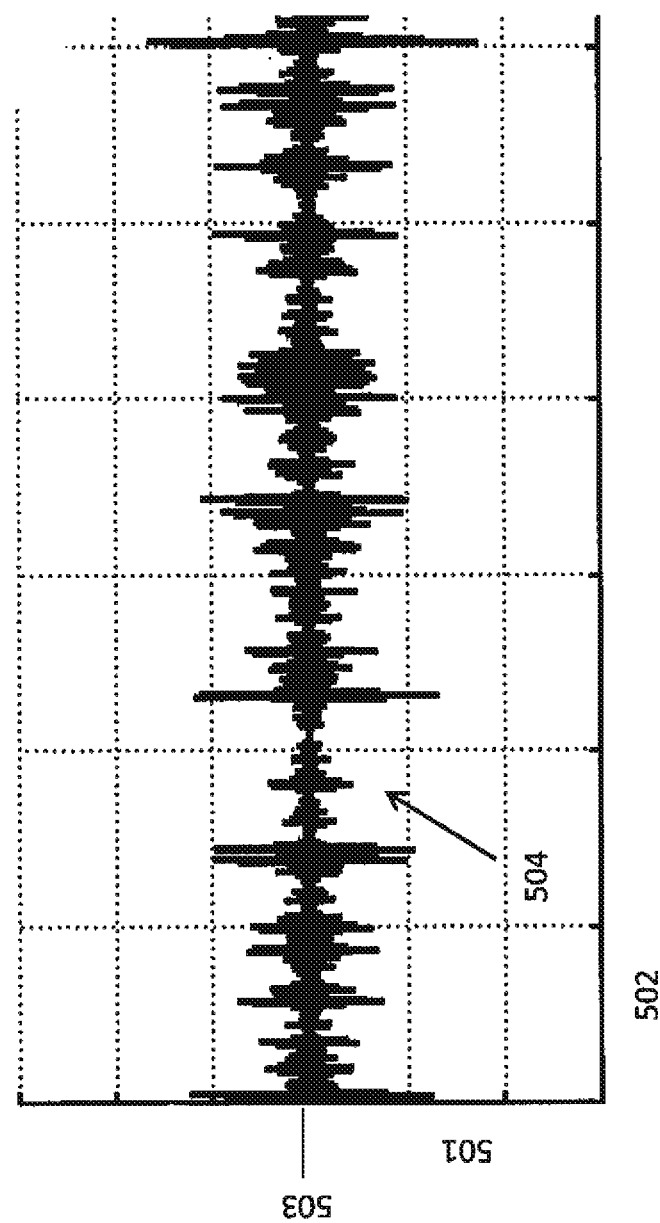
FIG. 2B shows an exemplary high-pass filtered vibration signal.

FIG. 2B exemplary shows a time series diagram of a high-pass filtered vibration signal 504, for example, the high-pass filtered vibration signal 404.

The ordinate axis 501 may, for example, again represent an acceleration axis, e.g. the vector sum of an acceleration signal, wherein the ordinate value 503, for example, may again represent a reference value for the vibration signal 504, such as a zero value, around which the vibration signal 504 may fluctuate.

In comparison to a high-pass filtered vibration signal 504, the corresponding unfiltered or raw vibration signal, for example vibration signal 404, the ordinate value 503 may differ from the ordinate value of the unfiltered vibration signal, e.g. 404, for example due to a correction of the unfiltered vibration signal by deducting the value of the earth acceleration.

The abscissa axis 502 may, for example, again be a time axis, which may be identical to the abscissa axis 402.

Figure 2C:
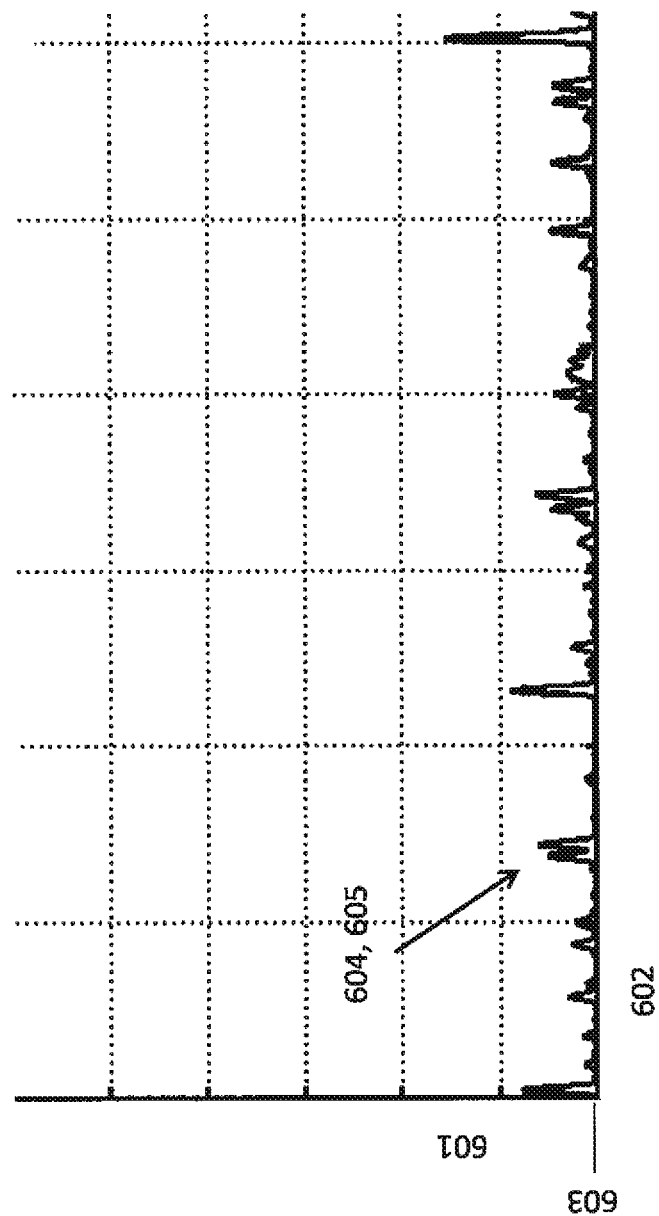
FIG. 2C shows an exemplary course of the amplitude of a high-pass filtered and squared vibration signal.

FIG. 2C exemplary shows a time series diagram of a course of the amplitude of a high-pass filtered and squared vibration signal 604, for example, a course of the amplitude of the high-pass filtered and squared vibration signal 404.

The axis 602 corresponds to the axis 502 of FIG. 2B.

The axis 601 represents analogous to axis 501 an acceleration axis, wherein the scaling of the axis 601 can be considered as analogous to the axis 501, except for a displacement of the origin of the ordinate axis 601.

As origin of the ordinate axis 601, for example, the ordinate value 603, for example a zero value, can be specified.

The amplitude course of the high-pass filtered and squared vibration signal 604 exemplary shows the average power 605 of the vibration signal or the course of the average power of the vibration signal.

Figure 2D:
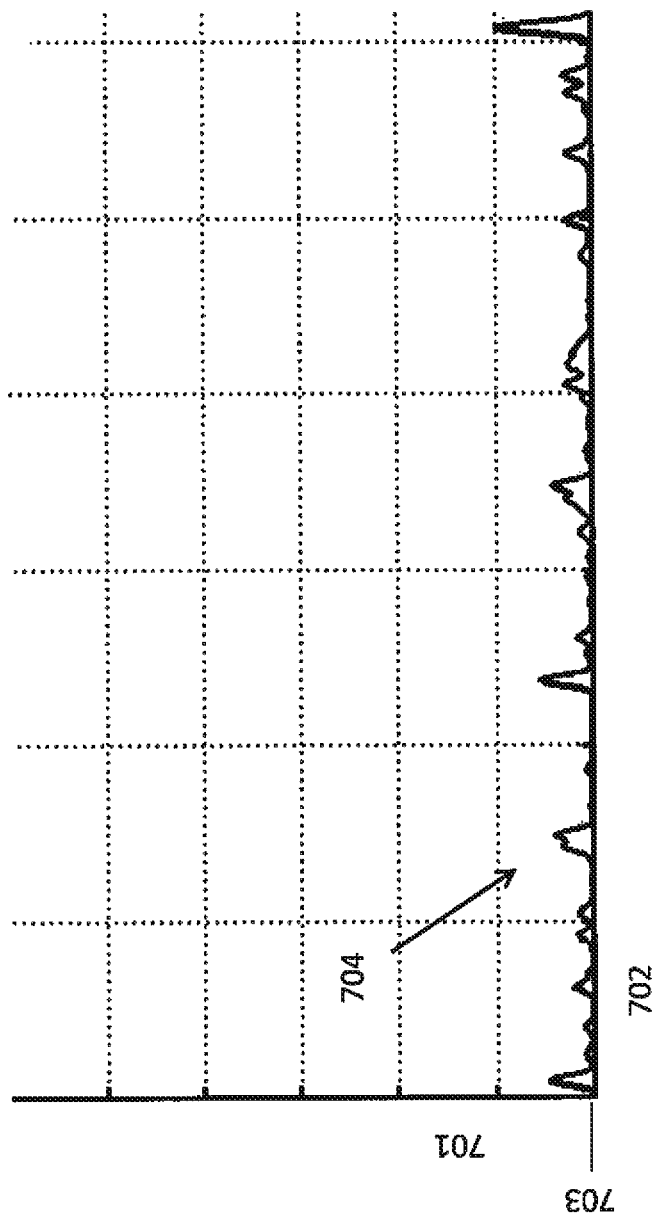
FIG. 2D shows an exemplary course of the amplitude of a high-pass filtered, squared and low-pass filtered vibration signal.

FIG. 2D exemplary shows a time series diagram of a course of the amplitude of a high-pass filtered, squared and low-pass filtered vibration signal 704, for example, a course of the amplitude of the high-pass filtered, squared and low-pass filtered vibration signal 404.

The axes 701, 702 thereby correspond to the axes 601, 602 of FIG. 2C, wherein the axes scales can be regarded as identical.

This optional method step in the envelope curve determination may advantageously improve the signal-to-noise ratio of the to be determined envelope curve, which may serve as basis for the calculation of a to be determined motion parameter of a freely-guided electronic device, for example of the velocity of a pen movement.

Figure 2E:
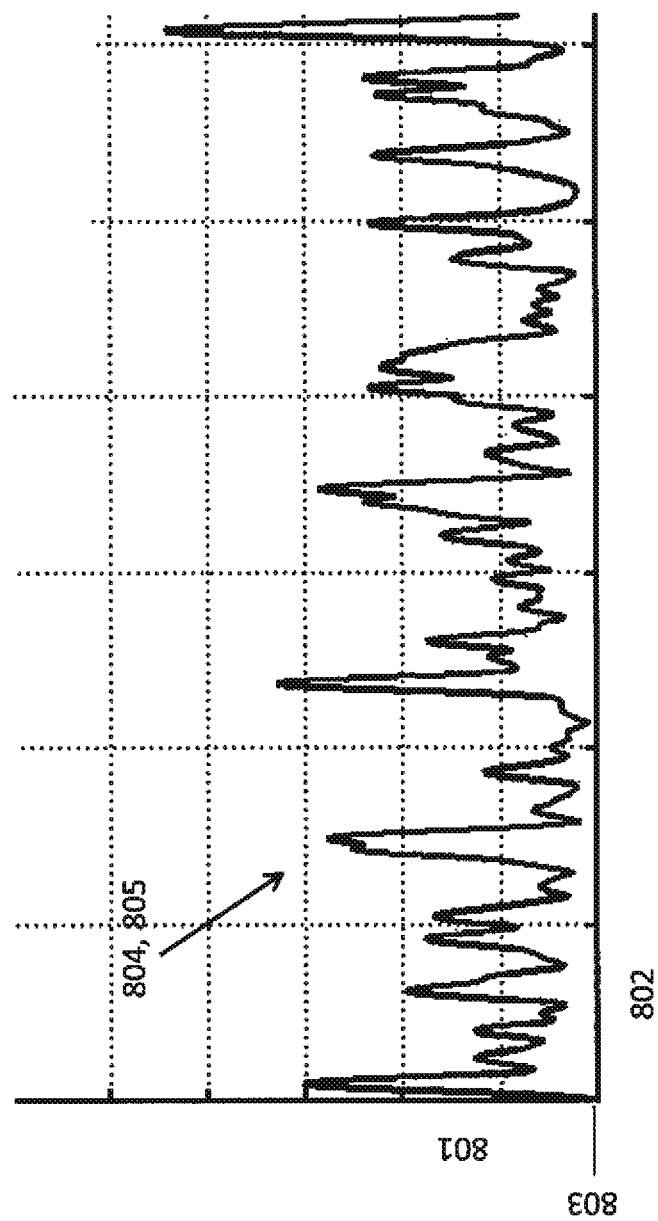
FIG. 2E shows an exemplary course of the amplitude of a high-pass filtered, squared, low-pass filtered and square rooted vibration signal / exemplary envelope curve.

FIG. 2E exemplary shows a time series diagram of a course of the amplitude of a high-pass filtered, squared, low-pass filtered and square rooted vibration signal 804, for example, a course of the amplitude of the high-pass filtered, squared, low-pass filtered and square rooted vibration signal 404.

The axes 801, 802 thereby correspond to the axes 601, 602 from FIG. 2C, respectively to the axes 701, 701 from FIG. 2D, wherein again the axes scales can be regarded as identical.

The amplitude course of the high-pass filtered, squared, low-pass filtered and square rooted vibration signal 804 exemplary represents an envelope curve 805, the amplitude of which can at least partly be in a linear relationship with the to be determined motion parameter of the freely-guided device, for example with a velocity of a pen movement.

Figure 3:
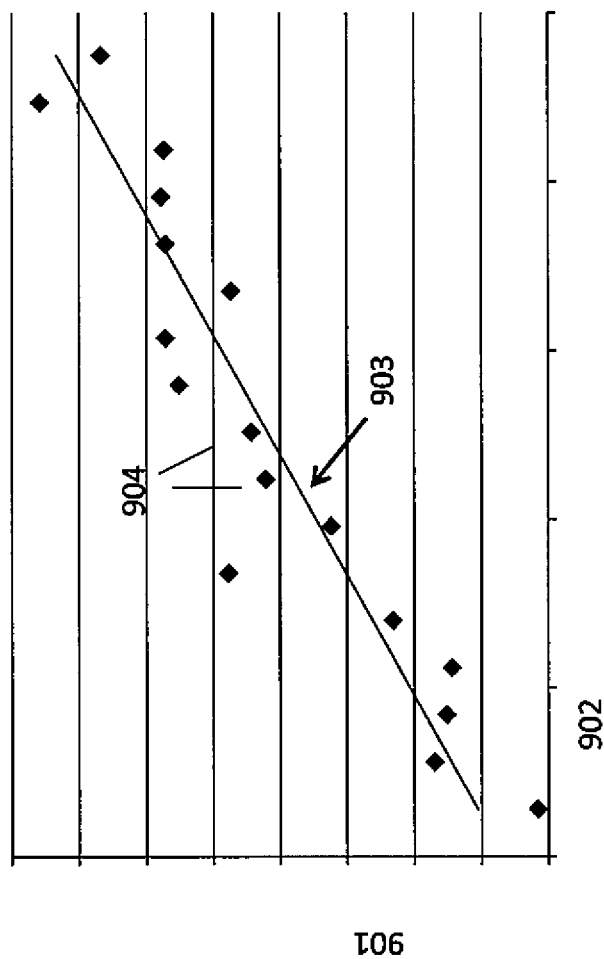
FIG. 3 shows an exemplary relation between envelope curve amplitude and a to be determined motion parameter, for example the velocity of a pen movement.

FIG. 3 exemplary shows the at least partially linear relationship between the envelope curve amplitude of a vibration signal and to be determined motion parameter, for example a velocity of a pen movement.

Here, the axis 902 shows exemplary the axis of a to be determined motion parameter, for example a velocity of a pen movement, and the axis 901 shows exemplary the envelope curve amplitude axis, for example an axis for the averaged envelope curve amplitude.

As evident from the exemplary envelope curve amplitude measurements 904 an at least in parts linear relationship 903 between a to be determined motion parameter, for example a velocity of the pen movement, and the envelope curve amplitude, derived from a vibration signal corresponding to said motion parameter, can be established. For this, among other things, for example, linear regression methods may be used.

This relation 903 advantageously may allow to determine the to be determined parameter of a freely-guided device, such as for example a velocity of a pen movement, from a vibration signal of the freely-guided device.

Followed by 7 sheets with 9 figures. The reference numerals are assigned as follows.

100 (first) velocity of the pen movement of an electronic pen on a writing substrate, or first velocity of the device movement of a freely-guided electronic device 101 ordinate axis, e.g. acceleration axis, e.g. vector sum of an acceleration signal 102 abscissa axis, e.g. time axis 103 reference value for a vibration signal, e.g. zero value or value of the earth acceleration 104 average amplitude 105 vibration signal 200 (second) velocity of the pen movement of an electronic pen on a writing substrate, or second velocity of the device movement of a freely-guided electronic device
201 ordinate axis, e.g. acceleration axis, e.g. vector sum of an acceleration signal
202 abscissa axis, e.g. time axis
203 reference value for a vibration signal, e.g. zero value or value of the earth acceleration
204 average amplitude
205 vibration signal
300 (third) velocity of the pen movement of an electronic pen on a writing substrate, or third velocity of the device movement of a freely-guided electronic device
301 ordinate axis, e.g. acceleration axis, e.g. vector sum of an acceleration signal
302 abscissa axis, e.g. time axis
303 reference value for a vibration signal, e.g. zero value or value of the earth acceleration
304 average amplitude
305 vibration signal
401 ordinate axis, e.g. acceleration axis, e.g. vector sum of an acceleration signal
402 abscissa axis, e.g. time axis
403 reference value for a vibration signal, e.g. zero value or value of the earth acceleration
404 vibration signal, e.g. unfiltered or unprocessed vibration signal
501 ordinate axis, e.g. acceleration axis, e.g. vector sum of an acceleration signal
502 abscissa axis, e.g. time axis
503 reference value for a vibration signal, e.g. zero value
504 high-pass filtered vibration signal
601 ordinate axis, e.g. acceleration axis, e.g. vector sum of an acceleration signal
602 abscissa axis, e.g. time axis
603 reference value for a vibration signal, e.g. zero value
604 exemplary course of the amplitude of a high-pass filtered and squared vibration signal
605 average power of the vibration signal
701 ordinate axis, e.g. acceleration axis, e.g. vector sum of an acceleration signal
702 abscissa axis, e.g. time axis
703 reference value for a vibration signal, e.g. zero value
704 exemplary course of the amplitude of a high-pass filtered, squared and low-pass filtered vibration signal
801 ordinate axis, e.g. acceleration axis, e.g. vector sum of an acceleration signal
802 abscissa axis, e.g. time axis
803 reference value for a vibration signal, e.g. zero value
804, 805 exemplary course of the amplitude of a high-pass filtered, squared, low-pass filtered and square rooted vibration signal, exemplary envelope curve according to the invention
901 envelope curve amplitude axis, for example an axis of averaged envelope curve amplitudes
902 axis of a to be determined parameter of a freely-guided device, for example a velocity of the movement of an electronic pen
903 at least partially linear relationship between a to be determined motion parameter, for example a velocity of a pen movement, and an envelope curve amplitude, for example an averaged envelope curve amplitude
904 exemplary envelope curve amplitude measurement(s), for example of averaged envelope curve amplitudes

The invention claimed is:

1. A method for determining at least one motion parameter of an electronic pen on a substrate, comprising:
determining a measurement of a vibration signal, which is generated by an interaction between a tip of the electronic pen and the substrate, and
determining the at least one motion parameter of the electronic pen from the measurement of the vibration signal of the electronic pen,
wherein an envelope curve of the vibration signal is calculated, and wherein the envelope curve calculation comprises at least one of the following steps:
calculating an average power of the vibration signal over a predetermined time window range around a current measurement time point, and/or
calculating an amplitude of the vibration signal from the average power of the vibration signal.

2. The method according to claim 1, wherein the vibration signal is determined from an acceleration signal and/or an acoustic signal.

3. The method according to claim 1, wherein the amplitude of the vibration signal is determined and/or a frequency spectrum of the vibration signal is determined.

4. The method according to claim 1, wherein, prior to the calculation of the average power of the vibration signal, a high-pass filtering of the vibration signal is carried out.

5. The method according to claim 4, wherein the high-pass filtering is carried out with a cutoff frequency which is more than 20 Hz.

6. The method according to claim 4, wherein the high-pass filtering is carried out with a cutoff frequency which is more than 40 Hz.

7. The method according to claim 4, wherein the high-pass filtering is carried out with a cutoff frequency which is more than 30 Hz.

8. The method according to claim 1, wherein, prior to the calculation of the amplitude of the vibration signal from the average power of the vibration signal, a low-pass filtering of the vibration signal is carried out, wherein the low-pass filtering is carried out with a cutoff frequency which is less than 10 or 5 Hz.

9. The method according to claim 1, wherein a calculation of an average amplitude of the envelope curve is carried out.

10. The method according to claim 1, wherein a power frequency spectrum of the vibration signal is determined.

11. The method according to claim 10, wherein a median power frequency for one or more motion parameter values is/are determined.

12. The method according to claim 11, wherein the at least one motion parameter is a velocity value of a velocity of a movement of the electronic pen.

13. The method according to claim 1, further comprising:
determining a trajectory of the electronic pen, comprising:
an integration of the determined at least one motion parameter of the electronic pen.

14. The method according to claim 13, wherein the integration of the determined at least one motion parameter is an integration of a velocity signal of a movement of the electronic pen.

15. The method according to claim 1, wherein the at least one motion parameter is a velocity signal of a movement of the electronic pen.

16. An electronic pen with position detection comprising at least an electric voltage source, a digital control unit, and one or more measurement sensors, wherein
the digital control unit comprises a processor,
the measurement sensors are configured such that they capture a vibration signal, which is generated by an interaction between a device tip of the electronic pen and a substrate, the measurement sensors and the digital control unit are configured such that a motion parameter of the electronic pen is determined by the digital control unit from the captured vibration signal based on data signals transmitted from the measurement sensors to the digital control unit, and an envelope curve of the vibration signal is calculated, and wherein the envelope curve calculation comprises at least one of the following steps:

calculating an average power of the vibration signal over a predetermined time window range around a current measurement time point, and/or calculating an amplitude of the vibration signal from the average power of the vibration signal.

17. The electronic pen according to claim 16, wherein the measurement sensors comprise one or more sensors of at least one of the following types: acceleration sensor, rotation rate sensor, magnetic field sensor, and acoustic sensor.

18. The electronic pen according to claim 16, wherein the motion parameter is a velocity signal of a movement of the electronic pen.

\* \* \* \* \*